(No Model.) 3 Sheets—Sheet 1.
A. C. CAMPBELL.
AUTOMATIC STOP CLUTCH.
No. 519,173. Patented May 1, 1894.
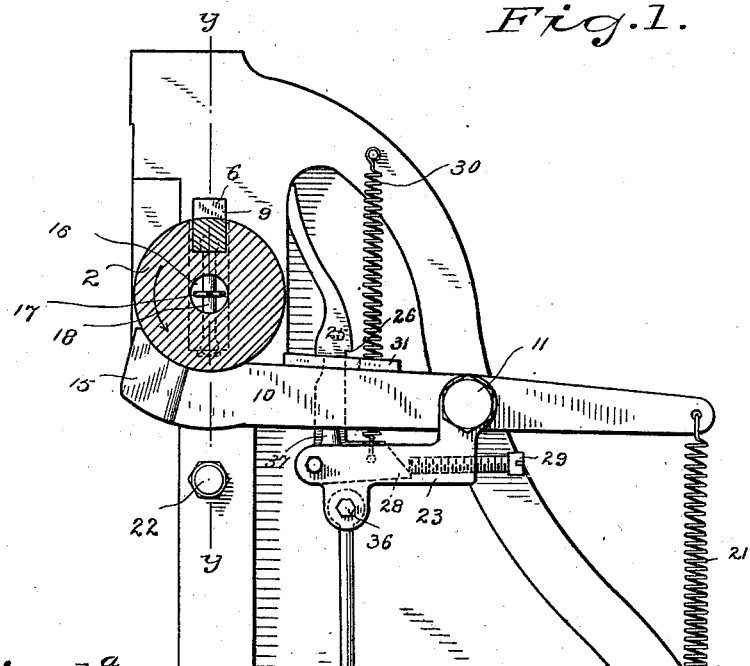
Fig. 1.
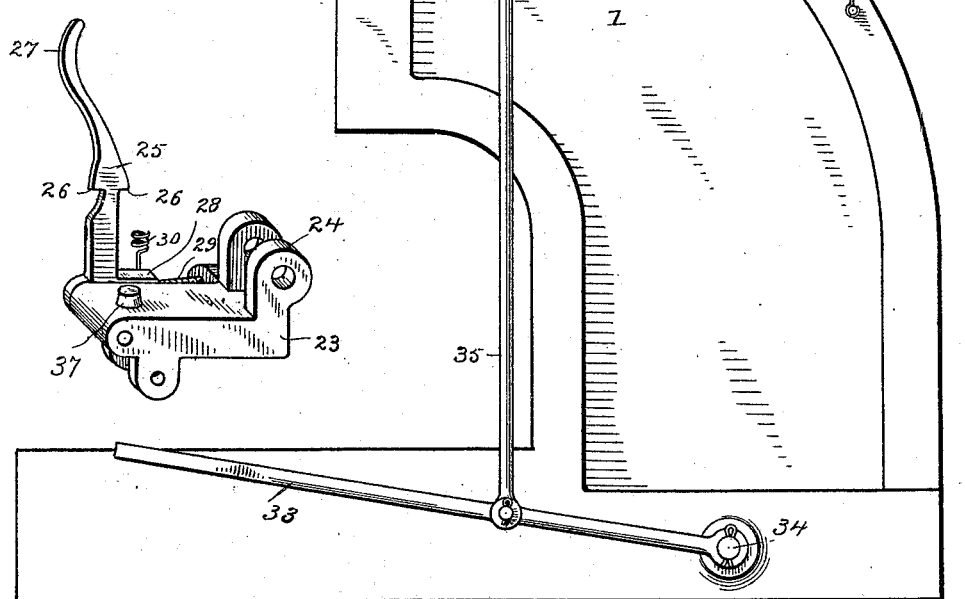
Fig. 1ª.
WITNESSES
H. A. Lauly
Susie V. Richardson.
INVENTOR
Andrew C. Campbell
By A. M. Wooster
Atty.

(No Model.) 3 Sheets—Sheet 2.

A. C. CAMPBELL.
AUTOMATIC STOP CLUTCH.

No. 519,173. Patented May 1, 1894.

Fig. 2.ª

WITNESSES
H. H. Lawlz
Susie V. Richardson.

INVENTOR
Andrew C. Campbell
By A. M. Wooster
Atty.

(No Model.) 3 Sheets—Sheet 3.
A. C. CAMPBELL.
AUTOMATIC STOP CLUTCH.
No. 519,173. Patented May 1, 1894.
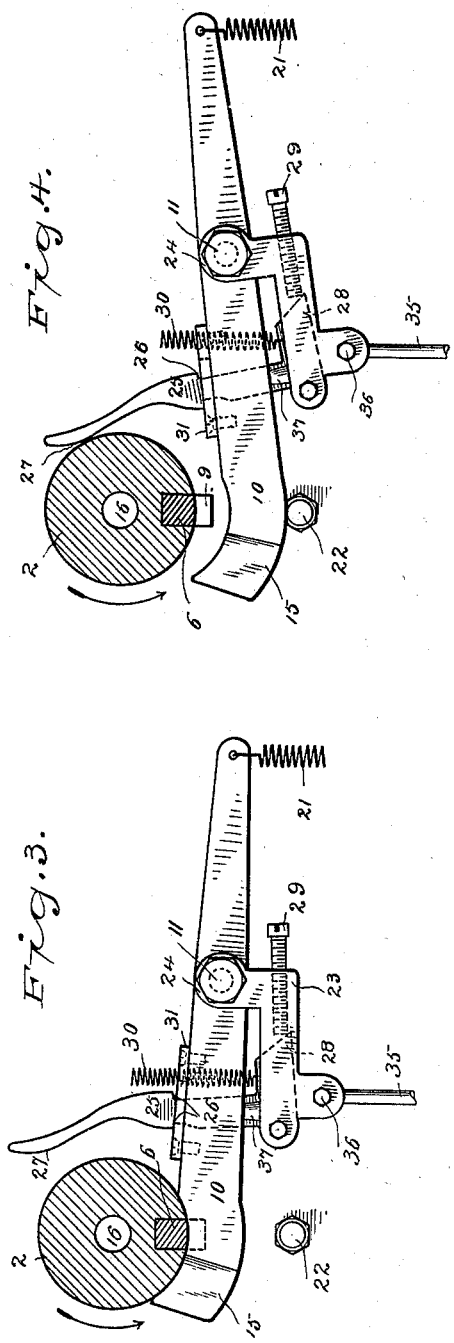
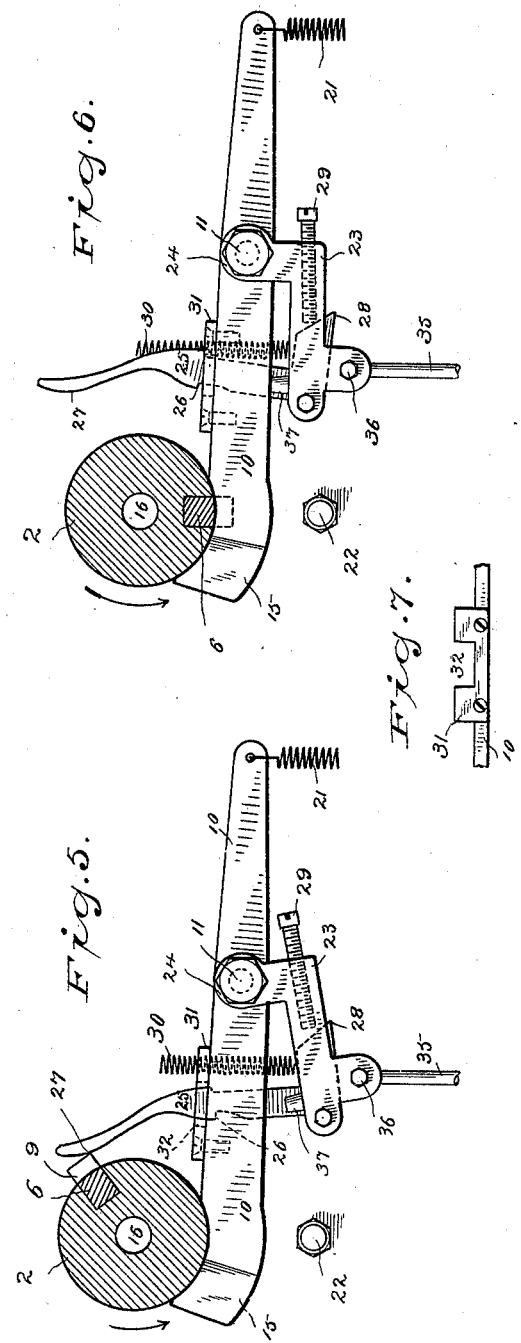
WITNESSES
H. A. Lamb
Susie V. Richardson
INVENTOR
Andrew C. Campbell
By
A. M. Wooster
Atty.

UNITED STATES PATENT OFFICE.

ANDREW C. CAMPBELL, OF WATERBURY, CONNECTICUT, ASSIGNOR TO THE WATERBURY FARREL FOUNDRY AND MACHINE COMPANY, OF SAME PLACE.

AUTOMATIC STOP-CLUTCH.

SPECIFICATION forming part of Letters Patent No. 519,173, dated May 1, 1894.

Application filed January 2, 1894. Serial No. 495,323. (No model.)

*To all whom it may concern:*

Be it known that I, ANDREW C. CAMPBELL, a citizen of the United States, residing at Waterbury, in the county of New Haven and State of Connecticut, have invented certain new and useful Improvements in Automatic Stop-Clutches; and I do hereby declare the following to be a full, clear, and exact description of the invention, such as will enable others skilled in the art to which it appertains to make and use the same.

My invention has for its object to produce an automatic release or stop clutch adapted for general use but more especially adapted for use upon power presses and hammers to render a second stroke impossible until the operator has relieved the pressure of his foot upon the treadle so that the treadle will return to its normal position and has again depressed the treadle.

With this end in view I have devised the novel automatic mechanism which I will now describe referring by numbers to the accompanying drawings forming part of this specification in which I have illustrated my novel stop clutch as applied to a power press.

Figure 2:
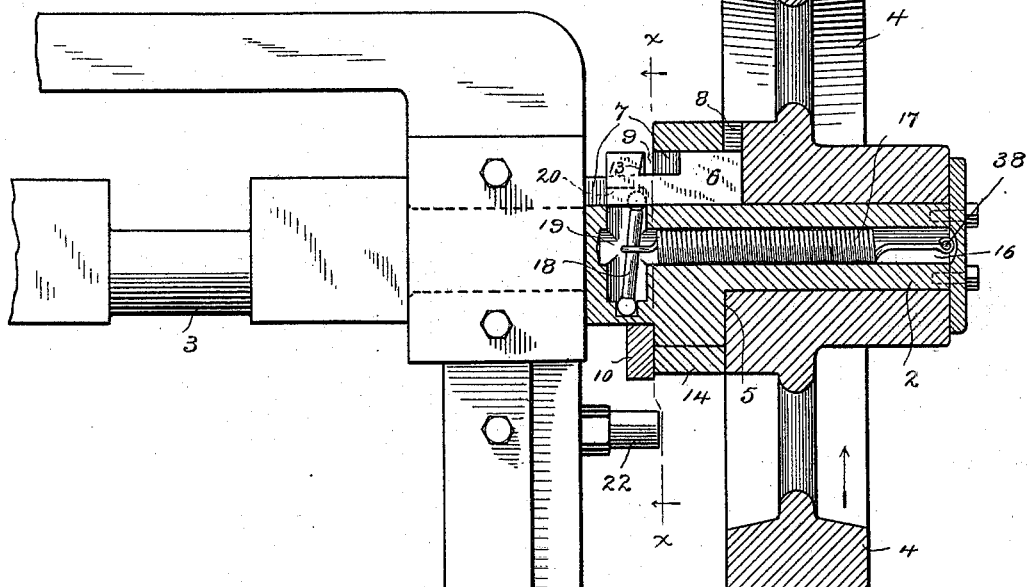
Figure 2:
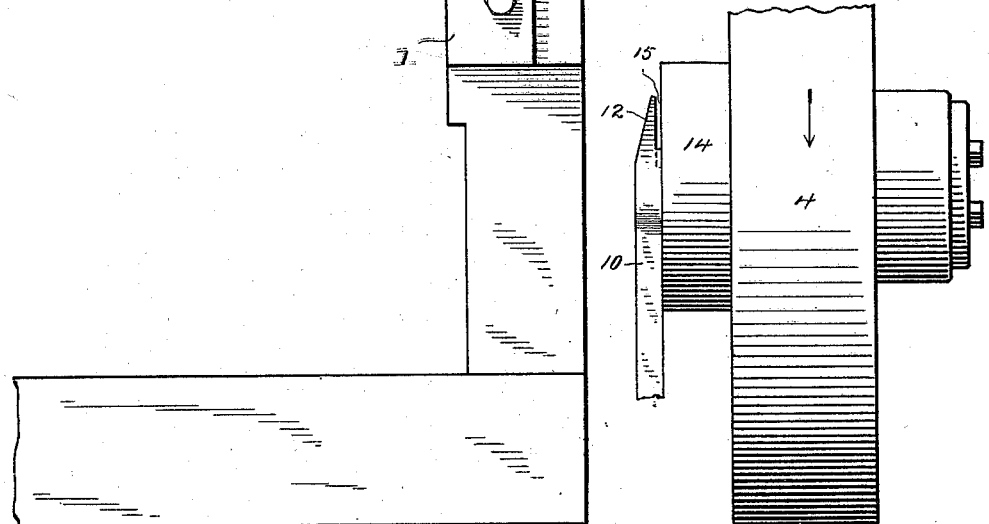

Figure 1 is an elevation of the frame of a power press the shaft being in section on the line *x x* in Fig. 2 looking toward the left; Fig. 1ª a perspective of the latch block detached; Fig. 2, a section of the shaft and belt pulley on the line *y y* in Fig. 1, a portion of the frame work of the press being in end elevation; Fig. 2ª a detail inverted plan view corresponding with Fig. 2. Figs. 3, 4, 5 and 6 are detail views of my automatic releasing mechanism illustrating different positions of the operative parts, and Fig. 7 is a detail plan view illustrating the locking plate on the releasing lever.

1 denotes the frame of a power press, 2 the operating shaft and 3 the crank. These parts may be of any ordinary or preferred construction.

As the press itself has nothing to do specifically with my present invention no further reference will be made thereto but my automatic releasing mechanism will be described solely with reference to the shaft.

4 denotes the belt pulley which turns freely on the shaft, the inner side of the belt pulley resting against a shoulder 5 on the shaft.

6 is a sliding key which lies in a recess 7 in an enlargement of the shaft, and is adapted to enter a socket 8 in the belt pulley thereby connecting the belt pulley with the shaft so that the latter will receive motion to operate the press. Sliding key 6 is preferably held in place by a collar 14 shrunk upon the shaft, and is provided in its upper side with a transverse groove 9 which is adapted to be engaged by a releasing lever 10 in the usual manner. This lever is pivoted to the frame as at 11; is slightly curved at its forward end to correspond with the curvature of the shaft; is provided at its end with a bevel 12 adapted to engage a corresponding bevel 13 at the rear end of groove 9 in the key, and is also cut away as at 15 on its inner side (that is the side toward collar 14 and the enlargement on the shaft). The purpose of this cutaway at 15 will presently be described in full.

16 denotes a longitudinal opening in the shaft which receives a suitable coil spring 17, one end of said spring being rigidly secured at the outer end of the shaft, for example by a pin 38 as shown in the drawings, the other end engaging a pin 18 lying in a socket 19 at the inner end of the longitudinal opening. The upper end of this pin engages sliding key 6 and acts in connection with the spring to force the sliding key into socket 8 the instant the latter registers with the key. The rear end of the sliding key is preferably provided with a socket 20 to receive the upper end of the pin so that there is no possibility of the parts becoming displaced in use. At the rear end of the releasing lever is a spring 21, the other end of which is connected to the frame and the action of which is to draw the rear end of the lever down thereby keeping the forward end in contact with the shaft as clearly shown in Figs. 1, 2 and 3.

22 is a stop which limits the movement of the lever when drawn down by the treadle. Turning now to Figs. 3 to 6 inclusive, in connection with Fig. 1ª, 23 denotes a block which I term the latch block and which is provided with ears 24 which lie on opposite sides of the releasing lever and through which pivot 11 passes. These ears turn on pivot 11 independently of the lever.

25 denotes a latch pivoted to block 23. This latch extends upward from the block and is provided with locking shoulders 26 on opposite sides thereof and with a tail piece 27.

28 denotes a bevel nosed lug which extends backward from the latch and is adapted to be engaged by an adjusting screw 29 as will be more fully explained.

30 denotes a spring one end of which is connected to lug 28 and the other to the frame as clearly shown in Fig. 1, the action of said spring being to throw the latch forward into one of its locking positions as will presently be fully explained.

31 denotes a locking plate which is rigidly secured to the top of the releasing lever and is provided with a slot 32, see Fig. 7 and dotted lines in Figs. 4 and 5, through which the latch passes, either end of said slot being adapted to be engaged by one of the locking shoulders.

Any suitable means may be employed to draw the latch block, latch and releasing lever downward to release the key when the latch is in engagement with the lever.

In the drawings 33 denotes a treadle one end of which is pivoted to the frame as at 34, and 35 is a treadle rod extending upward from the treadle and pivoted to latch block 23 as at 36.

37 denotes a hub on the upper side of the latch block which engages the under side of the releasing lever and serves as a contact point between said latch block and the lever.

The operation is as follows; the normal adjustment of the latch is shown in Figs. 1, 3, 4 and 5, that is to say adjusting screw 29 is turned out far enough to permit spring 30 to draw the latch forward so that the front locking shoulder will engage locking plate 31. It will be seen in the several figures of the drawings that the shaft is rotating from the right toward the left. In Figs. 1 and 2 the sliding key is in engagement with the belt pulley so that the shaft is carried thereby. Fig. 3 shows a position of the parts at the instant the sliding key has been withdrawn from the belt pulley by the engagement of bevel 12 on the releasing lever with the bevel on the sliding key. If the belt pulley has but one slot as indicated in the drawings, it is obvious that the connection and disconnection of the belt pulley and shaft can be made in one position only of both parts. Suppose the parts to have been connected, as in Figs. 1 and 2, it is obvious that when the shaft reaches the position shown in Fig. 3 the sliding key will have been wholly withdrawn from the belt pulley by the engagement of the bevel on the releasing lever with bevel 13 on the key. So long as the parts remain in this position it is obvious that the belt pulley and shaft cannot be again connected for the reason that when the belt pulley and shaft are in proper position relatively to each other for the sliding key to pass into socket 8 the key will be retained out of operative position against the power of spring 17 by the releasing lever. So long therefore as the parts remain in the position shown in Fig. 3, but one revolution of the operating shaft can take place and consequently but one stroke of the press. When it is desired to connect the belt pulley and shaft again, the operator places his foot upon the treadle and presses down, the action of which is to draw the latch block, latch, releasing lever, &c., downward to the position shown in Fig. 4. As already stated the treadle rod is connected to the latch block. The latch however, which is pivoted to the latch block is thrown forward by means of spring 30 and the forward locking shoulder upon the latch is placed in engagement with locking plate 31 upon the releasing lever so that when the operator presses down upon the treadle he pulls down the latch block and latch and with them the releasing lever thus leaving the sliding pin free to be drawn into socket 8 by the power of spring 17 the instant the belt pulley reaches the proper position relative to the shaft. The position of the parts at this instant is shown in Fig. 4. An instant later however, as the shaft revolves tail piece 27 of the latch is struck by the portion of the sliding key which projects outward from the shaft and is thrown backward thereby disengaging the front locking shoulder from locking plate 31 as clearly shown in Fig. 5. As soon as the latch is disengaged from the locking plate spring 21 will draw the lever upward again to its normal position so that but a single revolution of the shaft can take place for the reason that at the instant the revolution of the shaft is completed the sliding key will be withdrawn from the socket 8 by the engagement of the bevel on the releasing lever with the bevel on the key. As soon as the operator removes his foot from the treadle, spring 30 will lift the latch block, latch, treadle rod and treadle to the position shown in Figs. 1 and 3 the forward locking shoulder 26 of the latch being in engagement with the locking plate. It makes no difference whether the operator is quick or slow in removing his foot from the treadle for the reason that the releasing lever will have been disengaged from the latch and will have returned to its normal position so that but one revolution of the shaft can take place and but one stroke of the press. This condition will continue until the operator again places his foot on the treadle which again draws down the latch block, latch and releasing lever to the position shown in Fig. 4 and permits another revolution of the shaft and another stroke of the press.

Suppose now that it is desired to dispense with the automatic feature, this can readily be done by turning in adjusting screw 29 against the bevel of lug 28 throwing said lug downward and throwing the latch backward so that the front locking shoulder 26 is wholly disengaged from the locking plate and the rear shoulder 26 placed in engagement therewith as clearly shown in Fig. 6. The effect of this movement is to make the latch, latch block and releasing lever fixed relatively to each other so that all will move together when the operator places his foot on the treadle. Suppose now that a continued succession of blows is required, the parts are adjusted as in Fig. 6, the operator places his foot on the treadle, and keeps it there until sufficient blows have been struck. If single blows at irregular intervals are required this result can be obtained the same as with the ordinary mechanism by placing the foot on the treadle and instantly removing it therefrom.

The cut away 15 on the inner face of the releasing lever, see Fig. 2$^a$, is a valuable feature of my invention in that it does away with all danger of the releasing lever being carried down and the sliding key released by friction between collar 14 and the lever itself.

As a matter of fact it has been necessary in clutches of this class as ordinarily constructed to provide special means for keeping the releasing lever in operative position. This difficulty I wholly avoid by cutting away the inner face of the releasing lever i. e. the side toward collar 14, from the end of the lever inward far enough so that the portion of the face of the collar that is moving downward will not be in contact with the lever so that there will be no downward drag upon the lever. The opposite side of the face of the collar however, that is, the portion of the face of the collar that has passed the lowest point in the revolution and is moving upward, will be in contact with the lever the tendency of which will be to draw the lever upward and retain it in contact with the shaft. The tendency to draw the lever upward while important is not as vitally important as the removal of all tendency to draw the lever downward.

Having thus described my invention, I claim—

1. The combination, with a shaft having a longitudinal opening 16 and a socket 19, of a belt pulley turning freely on said shaft and having a socket 8, a key adapted to engage socket 8, a pin lying in socket 19 and engaging the key, and a spring lying in the longitudinal opening and connected to the pin, the action of which is to move the key into socket 8 the instant said socket registers with the key.

2. The combination, with a shaft having a longitudinal opening 16, a transverse socket 19 and a recess 7, of a belt pulley turning freely on said shaft and having a socket 8, a sliding key adapted to engage said socket, a pin in socket 19 engaging the key, and a spring in opening 16 one end of which is attached at the outer end of the shaft, the other to the pin, the action of which is to move the key into the socket the instant said socket registers with the key.

3. The combination, with a shaft having a longitudinal opening 16, and a socket 19 at the inner end of said opening, of a belt pulley adapted to turn freely on said shaft and having a socket 8, a sliding key adapted to engage said socket and having a bevel 13, a pin in socket 19 engaging the key, a coil spring in opening 16 one end of which is rigidly secured at the outer end of the shaft and the other to the pin and which acts to move the key into the socket when said parts register, and a releasing lever having a bevel adapted to engage bevel 13 to withdraw the sliding key.

4. The combination, with a shaft, a belt pulley, and a spring actuated sliding pin adapted to engage the belt pulley, of a releasing lever having a locking plate 31 and adapted to engage the key to disconnect it from the belt pulley, a pivoted latch block, a latch pivoted to the latch block and adapted to engage the locking plate, a spring acting to move the latch forward into engagement with the locking plate, and suitable means by which the latch block, latch, and releasing lever may be drawn downward to release the key when the latch is in engagement with the lever, movement of the treadle and latch block having no effect on the releasing lever when the latch is disconnected from the locking plate.

5. The combination, with a shaft, a belt pulley, and a spring actuated key for connecting the belt pulley to the shaft, of a releasing lever having a locking plate 31 and adapted to engage the key to disconnect the belt pulley and shaft, a pivoted latch block, a latch pivoted to said latch block and having a locking shoulder adapted to engage the locking plate and a tail piece, a spring acting to hold said latch in the engaging position, and a treadle adapted to draw the latch block, latch, and releasing lever downward when the latch is engaged, the tail piece being engaged an instant later by the key, whereby the latch is disengaged from the locking plate so that the belt pulley and shaft cannot be again connected until the latch has engaged the locking plate which permits the releasing lever to be again moved out of operative position.

6. The combination, with a shaft, belt pulley, spring actuated sliding key, and a releasing lever having a locking plate 31, of a pivoted latch block, a latch pivoted to said block and having locking shoulders on opposite sides, each of which is adapted to engage the locking plate, a tail piece 27, and a bevel nosed lug 28, a spring acting to throw the forward locking shoulder into engagement with the locking plate so that the device will work automatically, and an adjusting screw engaging the bevel nosed lug and adapted to place the rear locking shoulder in engagement with the locking plate and retain it there so that the parts will operate in the ordinary manner.

7. The combination, with a shaft, belt pulley, and a spring actuated key adapted to connect the belt pulley to the shaft, of a collar on the shaft through which the key passes and a releasing lever adapted to engage the key to disconnect the belt pulley and shaft, the face of said lever toward the collar being cut away on the side of the collar having the downward movement, the portion of the face of the collar that moves upward only being in contact with the lever so that downward drag upon the lever is wholly avoided, the friction of the collar on the lever tending to hold it in operative position.

8. The combination with the shaft, pulley, sliding key and their operating connections and the releasing lever having a locking plate 31, of a pivoted latch block, a latch pivoted thereto and having a locking shoulder adapted to engage the locking plate, a spring acting to place the latch in the engaging position, suitable means for moving the releasing lever out of operative position when the latch is in the engaged position, and for disconnecting the latch from the locking plate.

9. The combination with the shaft, pulley, sliding key and their operating connections and the releasing lever having a locking plate 31, of a pivoted latch block, a latch pivoted thereto and having locking shoulders on opposite sides, both of which are adapted to engage the locking plate, and a bevel nosed lug 28, a spring acting to place the forward locking shoulder in engagement with the locking plate, suitable means for moving the releasing lever out of operative position when the latch is in the engaged position, and for disengaging the latch from the locking plate so that but one revolution of the shaft can take place before the belt pulley and shaft are disengaged, and an adjusting screw engaging the bevel nosed lug, whereby the rear locking shoulder may be placed in engagement with the locking plate so that automatic action of the releasing lever is prevented.

10. The combination with the shaft, pulley, sliding key and their operating connections, and a releasing lever having a locking plate, of a pivoted latch block, a latch pivoted thereto and having a shoulder adapted to engage the locking plate so that the lever, latch block, and latch move as one piece.

In testimony whereof I affix my signature in presence of two witnesses.

ANDREW C. CAMPBELL.

Witnesses:
HENRY FINSTERWALD,
GEO. ROWBOTTOM.